United States Patent
Burrier et al.

[11] Patent Number: 6,057,798
[45] Date of Patent: May 2, 2000

[54] APPARATUS AND METHOD FOR FREQUENCY MODULATION

[75] Inventors: Richard W. Burrier, Chelmsford; James T. Hanson, Maynard, both of Mass.

[73] Assignee: Raytheon Company, Lexington, Mass.

[21] Appl. No.: 06/719,021

[22] Filed: Jan. 18, 1985

Related U.S. Application Data

[63] Continuation of application No. 06/312,598, Oct. 19, 1981, abandoned.

[51] Int. Cl.$^7$ .................................................. G01S 7/28
[52] U.S. Cl. ............................................ 342/200; 342/199
[58] Field of Search .................... 343/17, 5; 328/133, 328/134, 155; 342/199, 200; 327/5, 100; 331/2, 11

[56] References Cited

U.S. PATENT DOCUMENTS

| | | | |
|---|---|---|---|
| 4,023,116 | 5/1977 | Alfke et al. | 331/17 |
| 4,123,719 | 10/1978 | Hopwood et al. | 327/5 |
| 4,176,351 | 11/1979 | DeVita et al. | 343/9 R |
| 4,593,287 | 6/1986 | Nitardy | 342/200 |

*Primary Examiner*—John B. Sotomayor
*Attorney, Agent, or Firm*—Daly, Crowley & Mofford, LLP

[57] ABSTRACT

A method and apparatus for frequency modulating a continuous wave signal is shown to comprise a voltage-controlled oscillator (VCO) having a first and a second control loop to maintain the carrier frequency of such VCO at a frequency determined by a crystal-controlled oscillator and to maintain the peak deviation of the FM modulation on such carrier frequency at a value equal to the deviation of the first Bessel null from the carrier frequency.

3 Claims, 2 Drawing Sheets

APPARATUS AND METHOD FOR FREQUENCY MODULATION

This application is a continuation of application Ser. No. 312,598 filed Oct. 19, 1981 now abandoned.

BACKGROUND OF THE INVENTION

This invention pertains generally to continuous wave (CW) radar systems having a capability to determine range, and particularly to circuitry for accurately controlling the frequency modulated ranging waveform required by such systems.

As is known in the art, one capability of a CW radar system is the ability to measure, without ambiguity, the velocity of moving targets even though clutter may also be present. A CW radar is, however, incapable of measuring range unless some provision is made to modulate the transmitted signal. One known modulation technique for providing a CW radar with a ranging capability is to frequency modulate (FM) the transmitted CW carrier signal. In known systems utilizing such a technique, the deviation of the FM transmitted signal is compared to that of an FM standard whose deviation is precisely known. Any resulting error then is used to generate a correction signal, changing the deviation of the FM transmitted signal to null the resulting error. The accuracy of any such implementation is, of course, directly related to the accuracy of the FM standard. Unfortunately, however, it is difficult to maintain the requisite accuracy of known FM standards, especially when such a standard must be used in adverse conditions such as are experienced in field use.

One known CW radar system with ranging capability is shown in U.S. Pat. No. 4,176,351 to DeVita et al. According to the cited patent the transmitted signal is frequency modulated at a low modulation frequency and peak deviation. Each received signal then is correlated with each different one of a plurality of differently delayed replicas of the transmitted signal to form a set of signals defining a cross-ambiguity function with a shape corresponding to the $J_O$ Bessel function. Finally, the individual signals in the set of signals are processed in a digital computer in accordance with Doppler and range algorithms to derive estimates of Doppler velocity and range of individual targets.

SUMMARY OF THE INVENTION

With this background of the invention in mind it is therefore an object of this invention to provide an improved CW radar incorporating circuitry that produces a known FM waveform under adverse conditions.

Another object of this invention is to provide an FM waveform with a sine wave deviation precisely controlled so that the carrier, or $J_O$, component nulls at a specific known deviation ratio.

The foregoing and other objects of this invention are generally attained by providing, in a CW radar, a voltage-controlled oscillator (VCO) for producing an FM signal comprising a CW carrier signal and modulation signal with a fixed peak frequency deviation. The frequency of the carrier signal is, by means of a phase-lock loop, locked to the frequency of a crystal-controlled oscillator and the peak deviation frequency of the modulation signal is, by means of a gain-controlled loop operating synchronously with the phase-lock loop, operative to control the level of the signal out of a sinusoidal oscillator so that such peak deviation corresponds with the deviation of the first Bessel null.

BRIEF DESCRIPTION OF THE DRAWINGS

The foregoing features and many of the attendant advantages thereof may be more fully understood from the following detailed description read together with the accompanying drawings, wherein.

DESCRIPTION OF THE PREFERRED EMBODIMENT

Before referring to the FIGURES, it will be noted that the present invention is an improvement over the CW radar shown and described in the cited patent to DeVita et al. Specifically, the present invention relates to the apparatus and method for generating a sinusoidal signal for frequency modulating a carrier signal in a CW radar. The details of the requisite processing and computing apparatus for received signals are shown and described in DeVita et al and will be included herein by reference.

Figure 1:
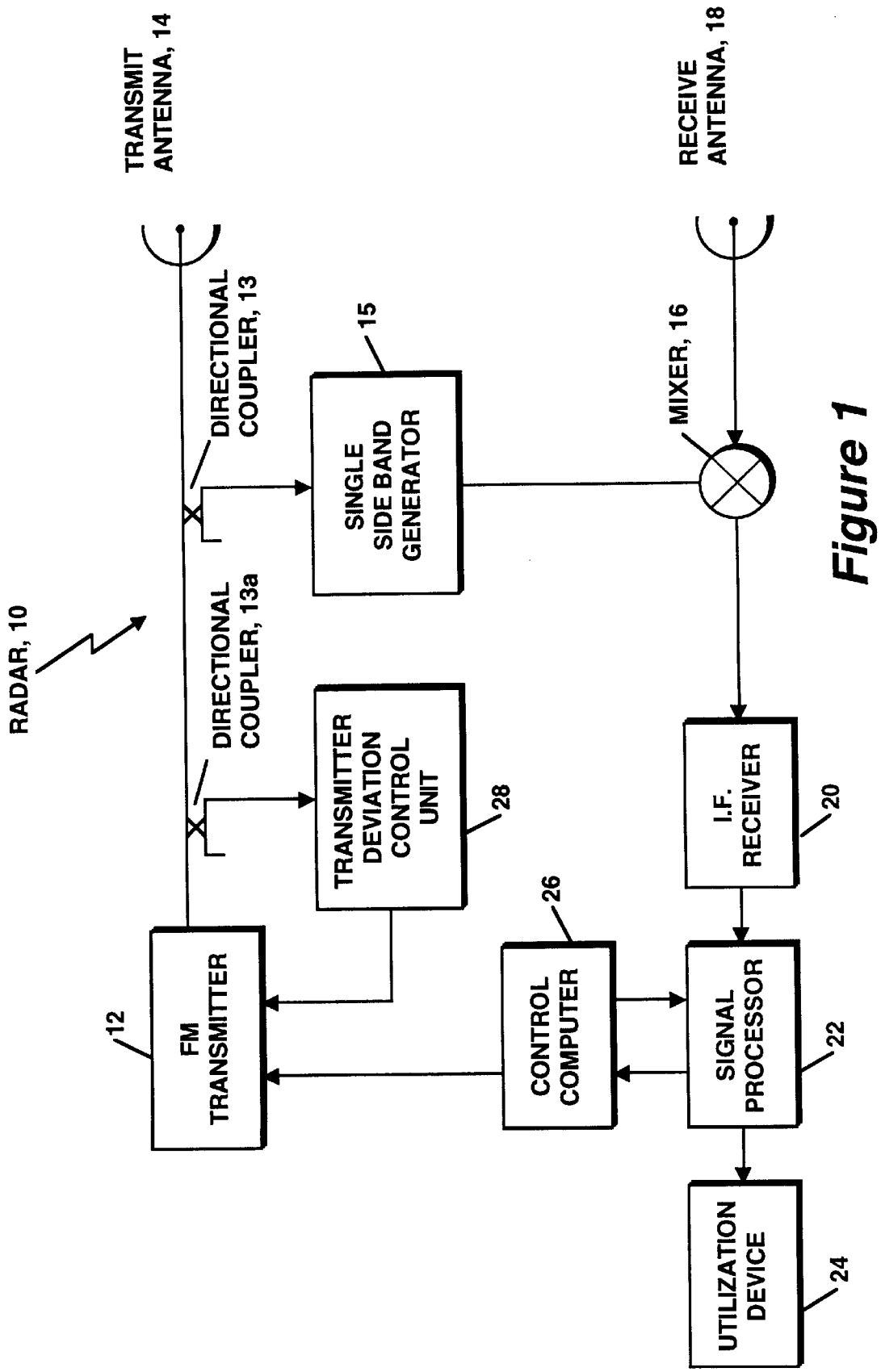
FIG. 1 is a simplified block diagram of a conventional CW radar system employing FM modulation to derive target ranging information; and another object of this invention is to provide an FM waveform with a sine wave deviation precisely controlled so that the carrier, or $J_O$, component nulls at a specific known deviation ratio.

Referring now to FIG. 1, a CW radar system 10 employing FM modulation techniques to derive target range information is illustrated. The radar system 10 is shown to include an FM transmitter 12 connected directly to a transmit antenna 14. A first portion of the output signal of the FM transmitter 12 is coupled, through a directional coupler 13, to a conventional single sideband generator 15 that operates to produce a local oscillator signal to a mixer 16. The second input to such mixer is taken directly from a receive antenna 18 so that any return signals from targets (not shown) are downconverted to suitable intermediate frequency (I.F.) signals for processing in an I.F. receiver 20. output signals from the I.F. receiver 20 are passed to a signal processor 22 in which, inter alia, the instantaneous deviation of each received FM signal is compared with the deviation of the transmitted signal to derive range information of each received FM signal. The output signals from the signal processor 22 are passed to a utilization device 24 which may, for example, be a display unit. Both the FM transmitter 12 and the signal processor 22 are shown to be under the control of a control computer 26 which, inter alia, maintains target files and schedules changes in the frequency of the FM transmitter 12. A second portion of the output signal from the FM transmitter 12 is coupled to a transmitter deviation control unit 28 through a directional coupler 13a. The transmitter deviation control unit 28 will be described in detail hereinbelow. Suffice it to say here that that unit is effective to generate an FM waveform with a precise deviation that is compared to the output of the FM transmitter 12 ultimately to control the deviation of the transmitted signal. It will now be recognized that, except for the improved transmitter deviation control unit 28 shown in detail in FIG. 2, the radar 10 is a conventional CW radar with FM modulation as shown in Skolnik's "Radar Handbook," operating to compare the phase of transmitted and received signals to determine the ranges of targets.

Figure 2:
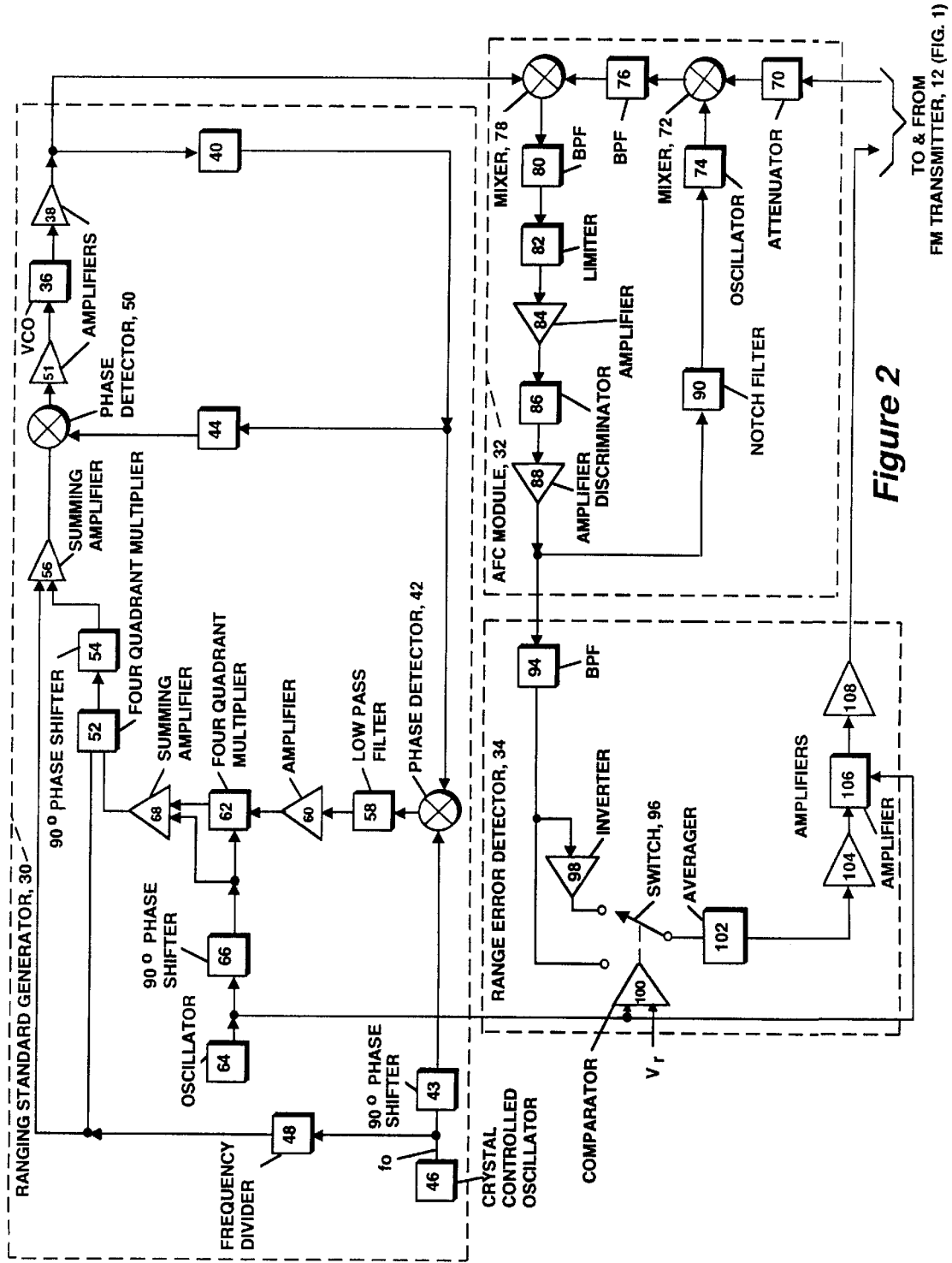
FIG. 2 is a simplified block diagram of the transmitter deviation control unit of FIG. 1.

Referring now to FIG. 2, the transmitter deviation control unit 28 is shown to comprise three major subassemblies: a so-called ranging standard generator 30; an AFC module 32; and a so-called range error detector 34.

Before any detailed discussion of the illustrated ranging standard generator 30, it will be noted that it basically consists of a Bessel nulling loop and a phase-lock loop, neither of which are numbered. The design of the Bessel nulling loop is based upon the fact that the carrier, or $J_O$, component of an FM spectrum with a sinewave deviation nulls at specific deviation ratios. That is to say, $$J_O(\beta) = 0 \text{ when } \beta = \frac{\Delta f}{f_m} = 2.405, 5.520, 8.654, \ldots \quad (1)$$

where: β is the deviation ratio, Δf is the peak frequency deviation, and $f_m$ is the modulation frequency. Within the Bessel nulling loop, then, a VCO (VCO 36) is deviated by a sinusoidal signal of frequency, $f_m$, derived from an oscillator 64. The output carrier of the $J_O$ component of the signal out of the VCO is synchronously detected (with the output signal from a crystal-controlled oscillator 46 serving as a reference). The detected signal then contains a bipolar D.C. term which may be used to control the level of the modulating signal to the VCO until the $J_O$ component of the output of the VCO is driven into a null. The phase-lock loop is provided to lock the frequency of the reference signal out of the crystal-controlled oscillator and the frequency of the carrier in the FM signal out of the VCO and to control the phase relationship between such reference signal and carrier.

The ranging standard generator 30, then, is shown to include a voltage controlled oscillator (VCO) 36 producing an FM signal that is amplified in a buffer amplifier 38. The FM signal from such amplifier is split, with a first portion thereof being applied via a frequency divider 40 (here a TTL logic device) to a phase detector 42. A second portion of the FM signal from the buffer amplifier 38 is passed to the AFC module 32, for reasons to be explained in detail hereinbelow. The frequency divider 40 is provided to set the peak frequency deviation, Δf, of the FM signal applied to phase detector 42 to an integer multiple of the deviation of the first Bessel null when $J_O$ (β)=0. The FM signal from the frequency divider 40 is split, with a first portion of such signal being applied to a phase detector 42 and a second portion applied to a frequency divider 44. The reference signal to the phase detector 42 is obtained, via a 90° phase shifter 43, from a crystal-controlled oscillator 46. (The 90° phase shifter 43 is provided to assure that the phase detector 42 operates as a phase sensitive amplitude detector.) The output signal from the crystal-controlled reference oscillator 46 is also passed to a frequency divider 48. A third portion of the FM signal from the buffer amplifier 38 is passed to the signal processor 22 (FIG. 1).

Digressing now for a moment, it will be noted that if a Bessel nulling loop alone were to be used, the signals from a reference oscillator (here crystal oscillator 46) and the FM signal derived from the VCO 36 would simply be phase-detected. If, then, the reference signal were represented by $f_o$ and the signal derived from the VCO 36 were represented by $[f_O+\beta f_m \cos (f_m t)]$, the result of phase detection would be represented by a D.C. term and spectral components at multiples of the modulating frequency, $f_m$. Such spectrum would be similar to the spectrum of a nulled carrier with sidebands symmetrically displaced by $f_m$ around the carrier. Therefore, as mentioned hereinabove, a phase-lock loop must be provided to assure that the carrier frequency of the FM signal derived from the VCO 36 and the frequency of the reference signal from the crystal-controlled oscillator 46 are synchronous and also to control the phase relationship between such reference signal and the $J_O$ component of the FM signal derived from the VCO 36. The Bessel nulling loop, when forced to null, will therefore null on the $J_O$ term and not on the $J_1$ term or some higher term.

The frequency dividers 44, 48, which are here identical digital counters, reduce the frequencies of the reference signal, $f_O$, and the FM signal from the frequency divider 40. The frequency divider 44 thus tends to reduce the modulation sidebands on such FM signal, thereby assuring compatibility with the second input signal to the phase detector 50 within the phase lock loop (not numbered). In this manner, the carrier from the VCO 36 is effectively locked to the $f_O$ reference from the crystal-controlled oscillator 46 and the proper Bessel nulling loop $J_O$ component is synchronously converted to D.C.

The output signal from the frequency divider 44 is passed directly to the phase detector 50, while the reference signal from the frequency divider 48 is passed to the phase detector 50 through a phase modulator (not numbered) comprising a four quadrant multiplier 52, a 90° phase shifter 54 and a summing amplifier 56. It will be appreciated that such a phase modulator is a so-called "Armstrong phase modulator" which is an effective circuit for linearly phase modulating a signal when the deviation ratio of such modulation is limited. The output signal from the phase detector 50 is passed, vla an amplifier 51, back to the VCO 36. The action of the phase lock loop (not numbered) will force the FM modulation on the carrier of the signal out of the VCO 36 (after frequency division) to be exactly the same as the phase modulated reference signal from the Armstrong phase modulator (not numbered).

The magnitude of the phase modulation, Δø, which must be impressed on the reference signal fed to the phase detector 50 may be expressed as:

$$\Delta\phi = \beta/N \text{ radians} \quad (2)$$

where β=2.405 for the first Bessel null. Where, as here, N=16 by reason of the frequency dividers 44, 48, Δø is 8.61 degrees (a phase modulation which is well within the capability of an Armstrong phase modulator). Thus, the signal out of frequency divider 48 (a sinusoidal CW signal) is modulated by sidebands generated in a balanced modulator (four quadrant multiplier 52) and the resulting signal is phase shifted by 90° to produce a phase-modulated signal. The output signal of the summing amplifier 56 then is an FM signal with a modulation index dependent on the relative amplitude of signals from the frequency divider 48 and the phase shifter 54. The four-quadrant multiplier 52 is used as the balanced modulator because such a multiplier produces an output signal that is directly proportional to both input signals.

The phase detector 42 acts as a Bessel null detector. To put it another way, the phase detector 42 acts as a phase-sensitive amplitude detector that produces a bipolar D.C. signal proportional to the $J_O$ (β) Bessel term of the signal out of the frequency divider 40. The operation of the Bessel nulling loop (not numbered) here is such that the $J_O$. (β) term is nulled at the first Bessel null (which occurs at a modulation index of 2.405). The Bessel nulling loop (not numbered) is modeled by assuming that in the vicinity of the null, the $J_O$ (β) term may be approximated by a straight line.

The bipolar D.C. signal from the phase detector 42 is passed, via a low pass filter network 58, to an amplifier 60. Such network and amplifier control the gain and time constant of the Bessel nulling loop. The loop gain and time constant are selected for the desired depth of null and rejection of the higher order Bessel terms (which consist of the modulating frequency and harmonics of the modulating frequency). The output signal from the amplifier 60 is passed to a four quadrant multiplier 62. The second input to such multiplier is the modulation frequency signal, $f_m$, obtained from an oscillator 64, via a 90° phase shifter 66. The output signal from the 90° phase shifter 66 is also applied to a summing amplifier 68. The second input signal to such amplifier is obtained directly from the four quadrant multiplier 62. The 90° phase shifter 66 is provided to insure that the modulation out of the Armstrong modulator is, in fact, FM. That is to say, the four quadrant multiplier 62 would, without correction, act as a phase modulator. However, because frequency is the derivative, or time rate of change, of phase and the effect of a 90° phase delay on a sinusoidal waveform is to create a cosinusoidal waveform (derivative of the sine function), the effect of the 90° phase shifter is to insure that FM modulation will be impressed on the signal out of the Armstrong modulator.

As mentioned hereinabove, a portion of the output signal from the buffer amplifier 38 is passed to the AFC module 32. Within the latter, that signal serves as a reference signal to an automatic frequency control (AFC) loop which is used to control the frequency deviation of the FM transmitter 12 (FIG. 1). Thus, the portion of the transmitter output signal coupled to the transmitter deviation control unit 28 is passed first to an attenuator 70 within the AFC module 32. The attenuator 70 is provided to control the level of the signal from the FM transmitter 12 (FIG. 1) to a mixer 72. Within such mixer the coupled output signal from the FM transmitter 12 (FIG. 1) is downconverted to a signal at a first I.F. frequency by being heterodyned with the output signal from a GUNN oscillator 74. The I.F. signal from the mixer 72 is filtered in a bandpass filter 76 and provided as a first input signal to a mixer 78. The second input signal to such mixer is the signal obtained from the buffer amplifier 38 within the ranging standard generator 30. The mixer 78 is effective to downconvert the I.F. signal from the FM transmitter 12 (FIG. 1) to a second I.F. frequency which is passed to a bandpass filter 80 that is provided to reject undesired output signals from the mixer 78. The output signals from the bandpass filter 80 are limited in a limiter 82 prior to being passed to an amplifier 84. The amplifier 84 serves as a driver for a frequency discriminator 86 which is effective to develop a D.C. frequency error control signal representative of the difference between the frequency of the input signal and the center frequency of the frequency discriminator 86 and an A.C. signal whose amplitude and phase is indicative of the error in the deviation of the F.M. transmitter 12 (FIG. 1). The frequency error output signal from the frequency discriminator 86 is amplified in a buffer amplifier 88, the output signal from which is split, with a first portion being passed, via a notch filter 90, (not shown) within the control computer 26 as a control signal to the GUNN oscillator 74 to control the output frequency of that device and thereby close the automatic frequency control loop. It will be recognized that, if provision for frequency agility is not desired, summing amplifier 92 and the connection between the AFC module 32 and the control computer 26 (FIG. 1) could be eliminated.

A second portion of the output signal from the buffer amplifier 88 is passed to the range error detector 34. Within such detector the frequency error signal is first filtered in a bandpass filter 94 and then split, with a first portion being applied directly to a single-pole, double-throw switch 96 and a second portion being applied to the latter through an inverter 98. The single-pole, double-throw switch 96 is shown to be controlled by the output signal from a comparator 100, one of the input signals to which is the modulation frequency signal, $f_m$, from the oscillator 64 within the ranging standard generator 30. The second input signal to the comparator 100 is a small bias voltage, $V_{REF}$.

The comparator 100 is effective to convert the sinusoidal signal from the oscillator 64 to a square wave output signal. It will now be appreciated by those of skill in the art that the single-pole, double-throw switch 96, the inverter 98 and the comparator 100 are effective to form a phase-sensitive amplitude detector producing a D.C. output signal that is filtered by averager 102 to reduce noise and is then, after passing through an amplifier 104, used in multiplier 106 to reconstitute the modulating signal, $f_m$, whose amplitude and phase (0° or 180°) is now a measure of the deviation error. The A.C. signal which is produced is passed, via a buffer amplifier 108, to the FM transmitter 12 (FIG. 1). Within the latter the range error signal is used to control the FM modulation of the carrier.

Having described a preferred embodiment of this invention, it will now be apparent to one of skill in the art that changes may be made without departing from the concepts of this invention. Thus, for example, if the VCO 36 were linear and if the system operates with a low modulation frequency and the bandwidth of the phase lock loop is increased so that the modulating signal is actually below the cut-off frequency of the phase lock loop, then the Armstrong phase modulator (not numbered) on the reference line to the phase lock loop detector 50 could be deleted. It is felt, therefore, that this invention should not be restricted to its disclosed embodiment, but rather should be limited only by the spirit and scope of the appended claims.

What is claimed is:

1. An improved ranging standard generator for generating a frequency modulated waveform having a precise frequency deviation, such generator comprising:
    (a) a voltage controlled oscillator;
    (b) a divide-by-M frequency divider for dividing the output signal from the voltage-controlled oscillator;
    (c) a crystal-controlled reference oscillator;
    (d) a pair of divide-by-N frequency dividers for dividing the output signals from the divide-by-M frequency divider and the crystal-controlled reference oscillator;
    (e) an oscillator tuned to the modulating frequency;
    (f) means, responsive to the output signals from the oscillator tuned to the modulating frequency and the pair of divide-by-N frequency dividers, for frequency modulating the voltage-controlled oscillator; and
    (g) means, responsive to the undivided output signal from the crystal-controlled reference oscillator and the output signal from the divide-by-M frequency divider, for controlling the deviation of the frequency modulated output signal from the voltage-controlled oscillator.

2. The improved ranging standard generator as in claim 1 wherein the means for frequency modulating the voltage-controlled oscillator comprises a phase lock loop including an Armstrong phase modulator for combining the divided-by-N output signal from the crystal-controlled reference oscillator and the output signal from the oscillator tuned to the modulation frequency.

3. The improved ranging standard generator as in claim 2 wherein the means for controlling the deviation of the frequency modulated output signal from the voltage controlled oscillator comprises a Bessel nulling loop including a phase sensitive amplitude detector for generating a bipolar D.C. signal for controlling the level of the modulating signal to the voltage controlled oscillator.

* * * * *